T. D. SLAUSON.
Stove-Pipe Thimbles.

No. 143,852. Patented Oct. 21, 1873.

Witnesses:
A. Bennerkendorf
C. Sedgwick

Inventor:
T. D. Slauson
Per Munn & Co
Attorneys.

UNITED STATES PATENT OFFICE.

THOMAS D. SLAUSON, OF HAVANA, NEW YORK.

IMPROVEMENT IN STOVE-PIPE THIMBLES.

Specification forming part of Letters Patent No. 143,852, dated October 21, 1873; application filed August 16, 1873.

*To all whom it may concern:*

Figure 1:
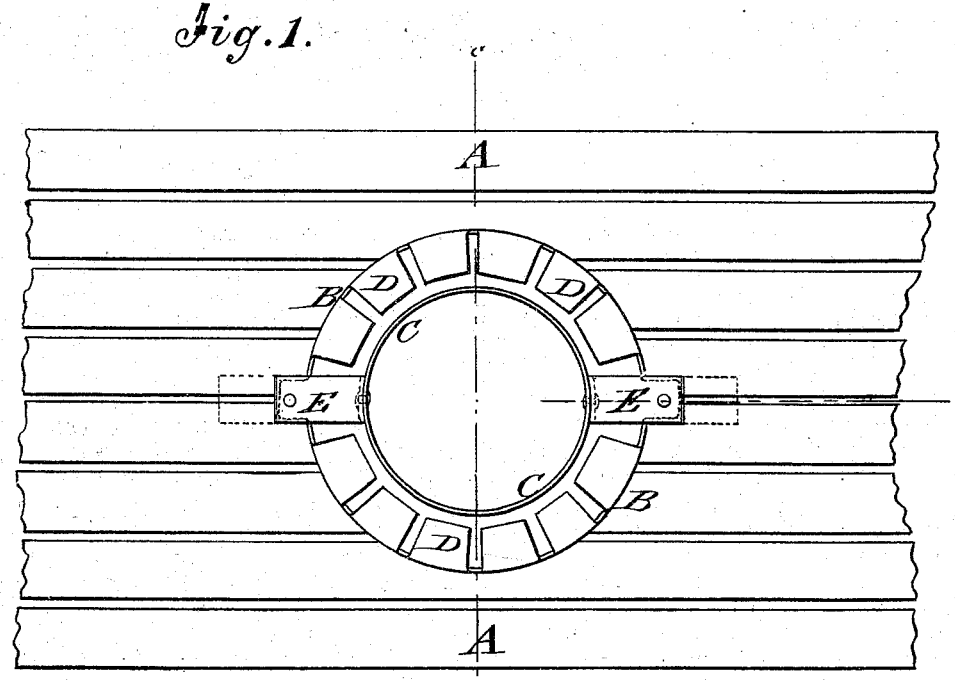
Figure 2:
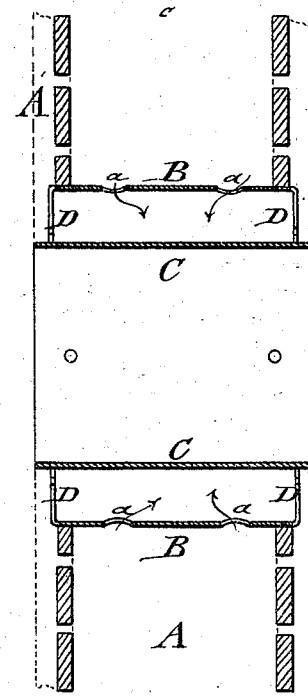

Be it known that I, THOMAS D. SLAUSON, of Havana, in the county of Schuyler and State of New York, have invented a new and Improved Stove-Pipe Safe, of which the following is a specification:

In the accompanying drawing, Figure 1 represents a front view of my improved stove-pipe safe as applied to a wooden partition. Fig. 2 is a vertical transverse section of the same on the line c c, Fig. 1; and Fig. 3, a detail section, showing attachment of safe to partition.

Similar letters of reference indicate corresponding parts.

The object of my invention is to furnish an improved casing or safe for conducting stove-pipes through wooden partitions, which is easily fastened in position, protects the lathing fully against any danger by fire, and leaves no communicating holes between the rooms, being fully covered by the plastering. My invention consists in a double casing, which is attached suitably to the wooden partition, being provided with bent-up face-pieces and side perforations, through which the circulation of the air around the inner casing is kept up.

Figure 3:
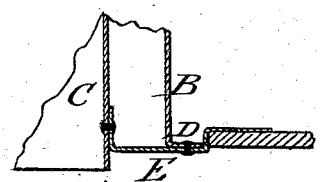

In the drawing, A represents the wooden partition or ceiling; B, the outer, and C the inner, thimble or casing which conducts the stove-pipe through the partition. The outer casing B is placed at such distance from the inner casing that full protection against danger by fire is obtained, both casings being made of tin, sheet-iron, or other suitable material. The inner casing C projects on each side beyond the lathing and the upper casing B to receive the plastering thereon. The outer casing B is cut at both ends with a series of pieces, D, with interstices between them, which pieces are bent over toward the inner casing, and sustain the plastering, which covers them fully. Small holes or perforations a of casing B, between the lathing of the partition, keep up the circulation of the air around the inner casing C. Diametrically opposite pieces D of casing B are turned outwardly, and riveted or otherwise attached to strips E of sheet metal, which are applied to the inner casing and the lathing of partition A, as indicated in Fig. 3, retaining thereby the whole safe firmly in position for the stove-pipe.

Having thus described my invention, I claim as new and desire to secure by Letters Patent—

The stove-pipe safe, consisting of outer casing B, with face-pieces D and side apertures a, inner casing C, connected by strips E, and held thereby in position in partition A, arranged substantially as and for the purpose described.

THOMAS D. SLAUSON.

Witnesses:
DANIEL T. SLAUSON,
G. T. WHIPPY.